United States Patent [19]
Junya

[11] Patent Number: 5,860,094
[45] Date of Patent: Jan. 12, 1999

[54] SYSTEM FOR PROTECTING INFORMATION STORED ON PHYSICAL MEDIA

[75] Inventor: Tempaku Junya, Tokyo, Japan

[73] Assignee: Samsung Electronics Co., Ltd., Suwon, Rep. of Korea

[21] Appl. No.: 709,149

[22] Filed: Sep. 6, 1996

Related U.S. Application Data

[63] Continuation of Ser. No. 194,289, Feb. 9, 1994, abandoned.

[30] Foreign Application Priority Data

Feb. 19, 1993 [JP] Japan .................................. 5-030738

[51] Int. Cl.⁶ ...................................................... H04L 9/00
[52] U.S. Cl. ............................... 711/5; 380/4; 380/50
[58] Field of Search ................................ 711/5, 115, 163, 711/164, 219; 395/186, 898; 235/492; 380/3, 4, 49, 50

[56] References Cited

U.S. PATENT DOCUMENTS

| | | |
|---|---|---|
| 4,168,396 | 9/1979 | Best ........................................... 178/22 |
| 4,488,001 | 12/1984 | Cooley et al. ........................ 178/22.09 |
| 4,698,617 | 10/1987 | Bauer ........................................ 380/28 |
| 5,095,525 | 3/1992 | Almgren et al. ........................ 711/202 |
| 5,249,232 | 9/1993 | Erbes et al. ............................... 380/49 |

*Primary Examiner*—Jack A. Lane
*Attorney, Agent, or Firm*—Jones & Volentine, L.L.P.

[57] ABSTRACT

An information storage medium within a data processing system, including an encoding circuit receiving a data signal and a memory address signal, and encoding the data signal in response to the memory address signal, and a data memory storing the encoded data signal.

3 Claims, 4 Drawing Sheets

P1, P2: ENCODING RULE DATA
Dkn: ENCODING DATA 5,860,094

SYSTEM FOR PROTECTING INFORMATION STORED ON PHYSICAL MEDIA

This a Continuation of application Ser. No. 08/194,289, filed on Feb. 9, 1994, which was abandoned upon the filing hereof.

BACKKGROUND OF THE INVENTION

The present invention relates to a system and method for protecting information stored on media such as IC memory cards, memory modules, and memory cassettes. More particularly, the present invention relates to a system and method for storing and retrieving information on physical media which provide enhanced security for the stored data, high-speed access of the stored data, and increased immunity from illegal copying of the information.

Unauthorized reproduction of information on storage media has long been a problem. Security conscious software vendors, employers, government agencies, and private computer users have struggled by various means to maintain the confidentiality of a wide variety of information. Several different systems and methods have been used to prevent unauthorized proliferation of proprietary information. These systems include encoding/decoding software and hardware.

For example, in the conventional data processing system shown schematically in FIG. 1, an encoding/decoding software routine or hardware circuit 4a is incorporated within a computation section 4 having central processing unit (CPU) 4b. Encoding/decoding software 4a is typically a basic input-output software (BIOS) routine(s). Computation section 4 typically includes logic circuits and software routines required to retrieve, execute, and store data. As part of well-known computation, execution and storage routines, computation section 4 retrieves data from, and stores data on an information medium 2 having a data memory 2a.

Within the conventional data processing system, encoded data is stored in data memory 2a of information medium 2. In theory, the encoded data is secure on information medium 2 until read from data memory 2a by the CPU, and decoded by decoding hardware/software 4a. However, the information medium 2 and, thus, the encoded data stored in data memory 2a may be physically copied in a wholesale manner. Thereafter, copies of information medium 2 may be applied to data processing systems having compatible decoding hardware and/or software in order to obtain the encoded data.

FIG. 2 illustrates a conventional method for preventing the unauthorized reproduction of stored information. This method establishes unique encoding algorithms or constructs (hereafter "rules") for each respective data processing system. As shown in the FIG. 2, the unique encoding rules are created by storing encoding rule data P1, P2, and encoding data Dkn in data memory 2a along with data D11, D12, . . . Dx.

Once encoded and stored according to the unique encoding rules, data is accessed and retrieved after reconstructing the data using the established encoding rules. There are numerous disadvantages to the method of using unique encoding rules. These disadvantages include reduced computation and data access speeds, and wasted data memory space. Furthermore, data stored on an information medium using unique encoding rules is susceptible to reverse engineering, whereby the information medium is physically copied, and the copy examined to ascertain the encoding rule keys.

In sum, conventional data processing systems do not adequately protect data stored on information media. Furthermore, conventional encoding methods impose high overhead requirements on data processing systems and do not fully protect confidential information data stored on information media.

SUMMARY OF THE INVENTION

Accordingly, it is an object of the present invention to provide an improved system and method for protecting data stored on information media. This is accomplished in one aspect of the present invention by providing a method for invalidating copied data. The present invention accomplishes the object of increased protection for stored information data without significant system overhead. That is, data access speed is not significantly compromised by the present invention.

To accomplish the foregoing objects, the present invention provides an information storage medium for use in a data processing system, wherein the information storage medium comprises an encoding circuit receiving a data signal and a memory address signal and a data memory. The encoding circuit encodes the data signal in response to the memory address signal, and stores the encoded data signal in the data memory.

The present invention also provides a method of storing information on a storage medium within a data processing system, the method comprising the steps of receiving a data signal and a memory address signal, encoding the data signal during a write operation in the data processing system in response to the memory address signal, and storing the encoded data signal.

BRIEF DESCRIPTION OF THE DRAWINGS

The above objects and other advantages of the present invention will become more apparent upon consideration of a preferred embodiment of the present invention with reference to the attached drawings in which.

DETAILED DESCRIPTION OF THE INVENTION

Conventional memory addressing may be done sequentially or non-sequentially according to an addressing scheme established by the CPU and associated software routines. Even in similar data processing systems, however, memory addresses vary widely because of variations in stored data and the stored data configuration. The present invention uses each "unique" sequence of memory addresses to encode data. That is, information data encoding is a function of memory address signals. This result is accomplished in one aspect of the present invention by an encoding/decoding circuit which manipulates the logic values of data bits forming respective memory address signals, and using these manipulated logic values to encode corresponding information data bits. Since encoding signals are simultaneously derived with the address signals during a data processing write/read operations, data storage and access speeds are not adversely affected.

Figure 3:
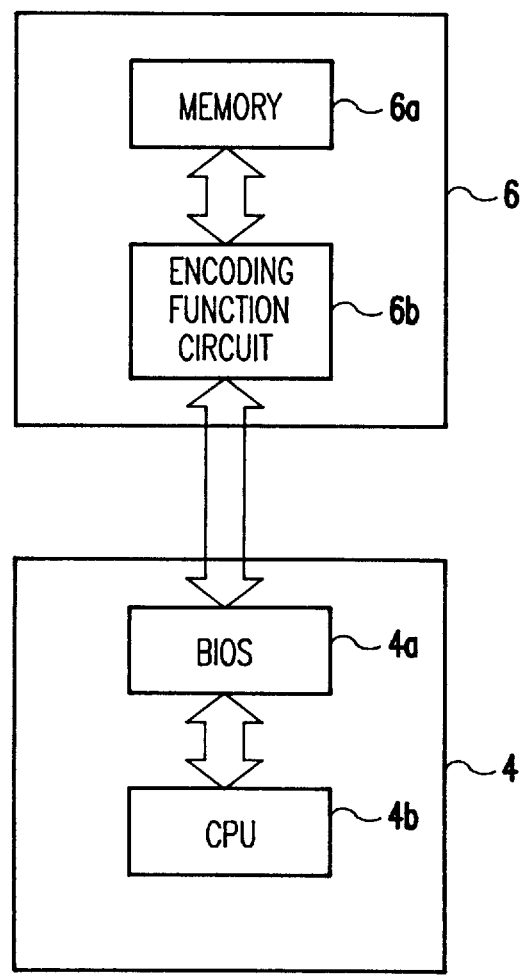
FIG. 3 is a schematic block diagram showing a data processing system incorporating the system and method for information data protection in accordance with one embodiment of the present invention.

As shown in FIG. 3, one embodiment of the present invention is characterized by the presence of a memory encoding/decoding circuit (hereafter an "encoding function" circuit) 6b within the information medium 6 along with data memory 6a. This aspect of the present invention may be applied to IC memory cards and memory cassettes.

Figure 1:
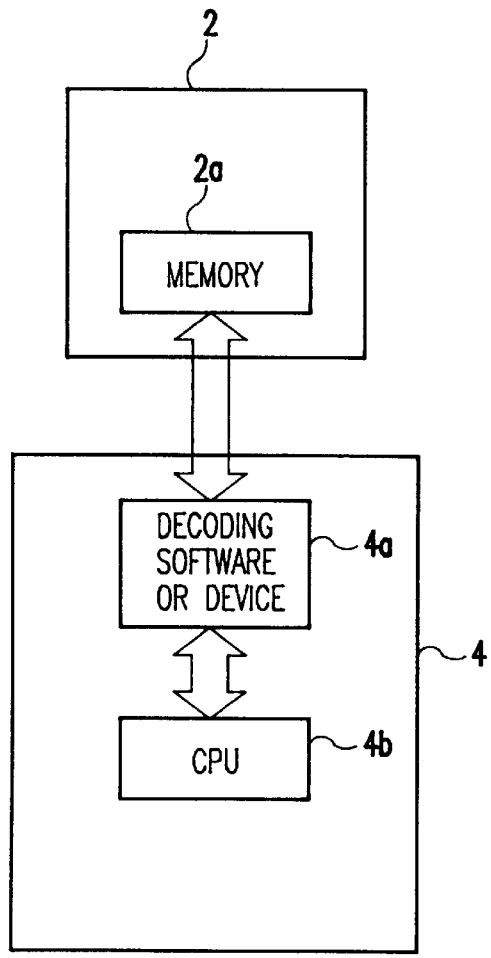
FIG. 1 is schematic block diagram showing a conventional data processing system and conventional information storage medium.
Figure 2:
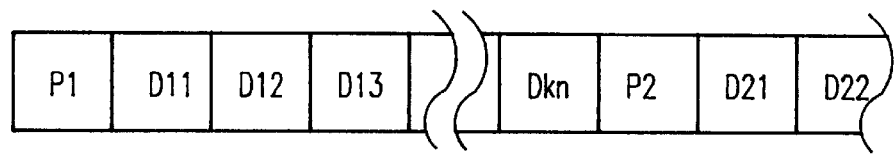
FIG. 2 is a diagram illustrating operation of conventional method for encoding/decoding information data.

In the same manner as the conventional data processing system shown in FIG. 1, the computation section 4 in FIG. 3 includes a CPU 4b and a BIOS 4a. The BIOS 4a may include a conventional encoding/decoding software routine, or any other conventional data processing routine. On the other hand, BIOS 4a may be entirely omitted from data processing systems incorporating the present invention.

In operation, the encoding function circuit 6b is connected between computation section 4 and data memory 6a. Encoding function circuit 6b encodes data written to data memory 6a during write cycles, and decodes data retrieved from data memory 6a during read cycles. Preferably, the encoding function circuit 6b will have a simple construction operating in a 1:1 encoding/decoding relationship to maximize information data access speed. Furthermore, the encoding function circuit 6b is Preferably embodied in a LSI (Large Scale Integrated) package in order to inhibit unauthorized copying and to reduce the physical size of the circuit.

Figure 4:
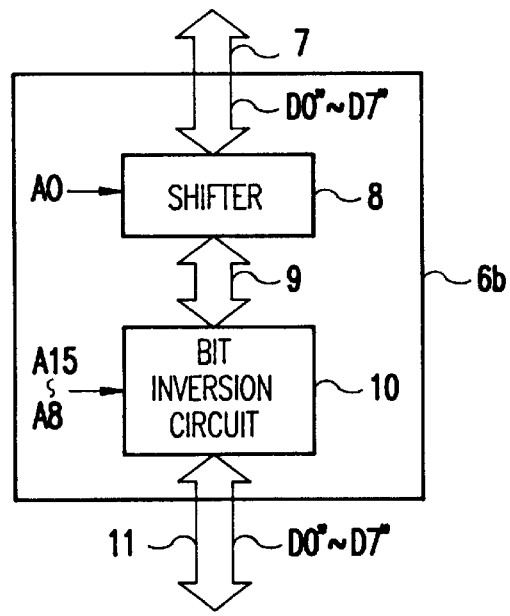
FIG. 4 is a schematic block diagram showing an encoding/decoding circuit according to one aspect of the present invention.

The encoding function circuit 6b in FIG. 3 is shown in greater detailing FIG. 4. In FIG. 4, the encoding function circuit 6b comprises shifter 8 and bit inversion circuit 10. Shifter 8 is connected to data memory 6a via data bus 7 (D0"-D7"), and to inversion circuit 10 via an internal data bus 9. Bit inversion circuit 10 is connected to computation section 4 via data bus 11 (D0–D7). In the illustrated example of the present invention, a 16-bit address signal (A0–A15) is used to read and write data to the information data medium. From this signal, a least significant address bit A0 is applied to shifter 8, and most significant address bits A8–A15 are applied to bit inversion circuit 10.

During a data write operation, an 8-bit information data word is written to a predetermined memory address, as defined by the 16-bit address signal, in data memory 6a through encoding function circuit 6b. The 8-bit information data word (D0–D7) is applied via data bus 11 to bit inversion circuit 10. Address signal bits A8–A15 are respectively added to data bits D0–D7 to "invert"the incoming data bits. There are no particular limitations or restrictions on the number and relative significance of the bits within the address signal which are used to invert the data bits. Once inverted, data bits are applied to the shifter 8 via the internal bus 9. The shifter then shifts the data bits to the left or to the right in accordance with the logical value of A0. Finally, the "bit-inverted and shifted"result (D0"–D7") is applied to data memory 6a via data bus 7 and stored in the predetermined memory address.

The foregoing operation is illustrated below for an example using a data word 55(H) being written to memory address 8301(H).

| | |
|---|---|
| Data word Input | 0 1 0 1, 0 1 0 1 [55(H)] |
| Address A8-A15 | 1 0 0 0, 0 0 1 1 [83(H)] |
| Bit-Inverted Result | 1 1 0 1, 0 1 1 0 [D6(H)] |
| Shifted Result (A0 = 1) | 1 0 1 0, 1 1 0 1 [AD(H)] |

In the illustrated example, shifter 8 comprises a wrap-around shift register which "wraps" the most significant bit of the Bit-Inverted Result to the right end of the data word when (A0=1, and which "wraps" the least significant bit of the Bit-Inverted Result to the left end of the data word when A0=0. Although shifter 8 may be implemented in various different structures, it is preferable to use a selector corresponding to the data density of information medium. In this way, the present invention can operate properly without being overly complicated even if the number of shifted data bits changes in accordance with a selected number of address bits.

During a data read operation, the foregoing data write operation is reversed to convert the stored data value, AD(H), back into the original information data value, 55(H).

Figure 5:
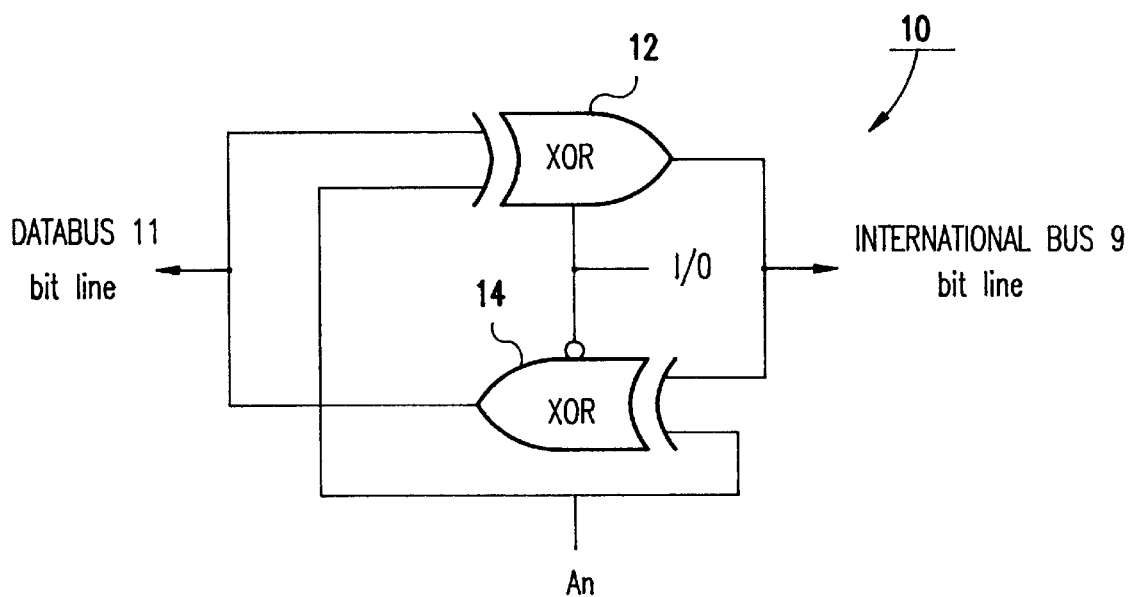
FIG. 5 is a bit inversion circuit applicable to the encoding/decoding circuit of FIG. 4.

One embodiment of the bit inversion circuit 10 of FIG. 4 is shown in greater detail by the circuit diagram of FIG. 5. As shown in FIG. 5, bit inversion circuit 10 comprises a plurality of cross-coupled exclusive-OR gates 12 and 14—one set of gates per data bit. Respective data bits are applied to the exclusive-OR gate 12 via a data bus 11 bit line, and inverted by applying a corresponding address bit, An, to exclusive-OR gates 12 and 14. The bit-inverted result is then applied to shifter 8 via the internal bus 9 bit line. Logic operation of the exclusive-OR gates is controlled by an I/O signal derived from the computation section 4.

Figure 6:
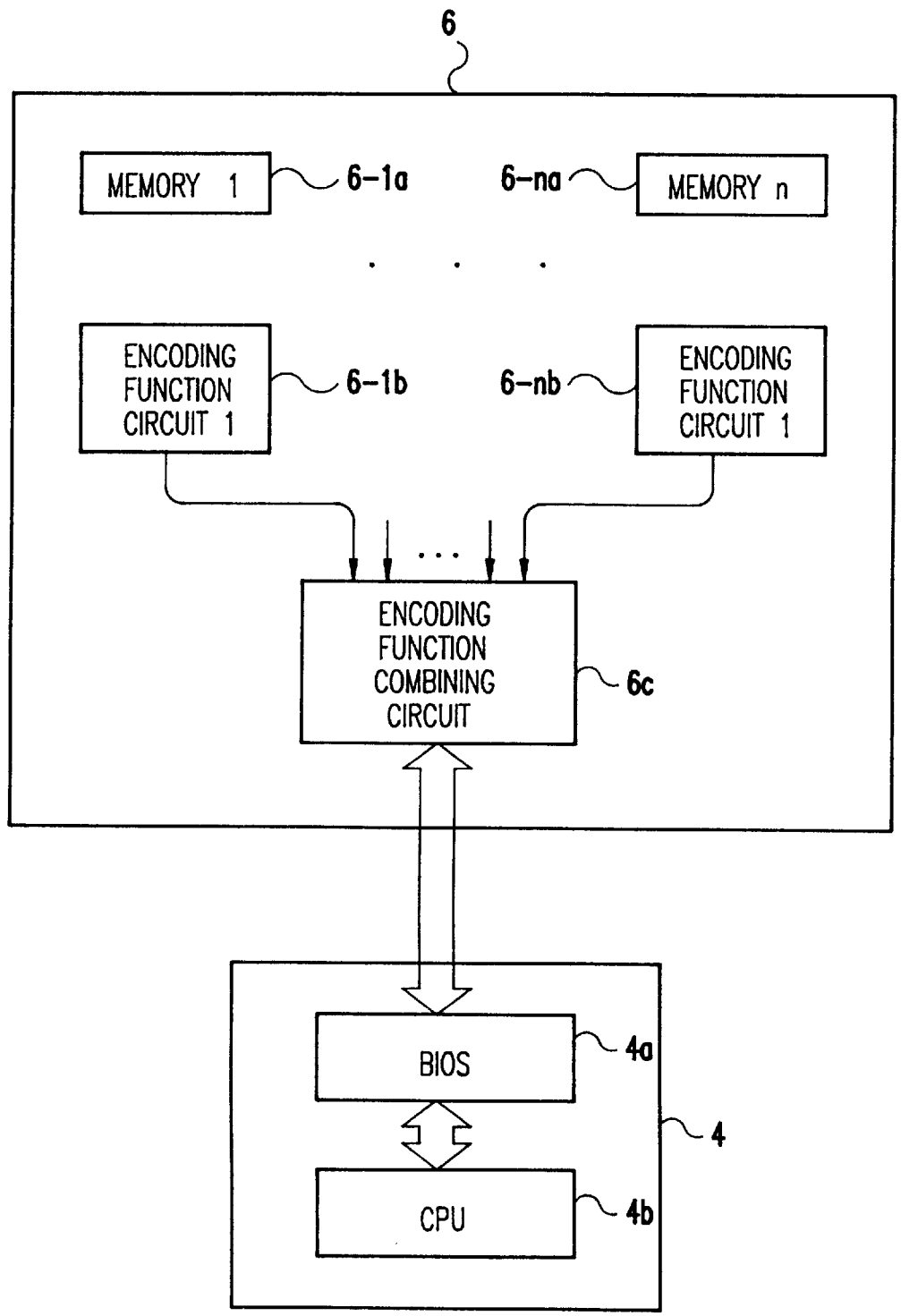
FIG. 6 is a schematic block diagram showing a data processing system incorporating the system and method for information data protection in accordance with another embodiment of the present invention.

FIG. 6 illustrates another embodiment of the present invention having an expanded structure within information medium 6. In this embodiment, information medium 6 includes a plurality of data memories 6-1a through 6-na, each one of which being paired in combination with a respective encoding function circuit 6-1b through 6-nb. Each encoding function circuit is connected to a encoding function combining circuit 6c which combines the respective outputs from encoding function circuits 6-1b through 6-nb. In this embodiment, the multistage encoding process provides greater complexity, and thus greater security for the stored information data.

By using the memory address signal, or selected portions of the memory address signal, to encode information data, the present invention maintains access speed and minimizes encoding overhead with data processing systems. Information data transferred via a copied information medium will be invalidated upon retrieval unless exact memory address signals are used to access the data. Accordingly, the confidentiality of stored information data can be maintained.

The preferred embodiment is given by way of example, and the invention recited in the attached claims is not limited to the illustrative embodiment. Those of ordinary skill in the art will recognize that routine design changes may be made to the exemplary embodiments without departing from the scope of the claims.

What is claimed is:

1. An integrated storage medium for use with a data processing system, said data processing system applying to said information storage medium a data signal comprising a plurality of information data bits and a corresponding address signal comprising a plurality of address data bits, said integrated information storage medium comprising:

a bit inversion circuit receiving said data signal and a first portion of said corresponding address signal, and adding logical values of respective information data bits to respective address bits to produce a bit-inverted data word;

a shifter circuit receiving said bit-inverted data word and a second portion of said corresponding address signal, and logically shifting bits of said bit-inverted data word in accordance with the value of said second portion of said corresponding address signal to produce a shifted, bit-inverted data word; and, data memory receiving said shifted, bit-inverted data word and storing said shifted, bit-inverted data word in accordance with said corresponding address signal.

2. An integrated storage medium for use in a data processing system having a computation section and performing read and write operations for data, said integrated storage medium comprising:

a plurality of encoding circuits, wherein each encoding circuit receives a selected portion of a data signal and a selected portion of a memory address signal, and wherein each encoding circuit encodes said selected portion of said data signal in response to said selected portion of said memory address signal;

a plurality of data memories, each data memory corresponding to one of said plurality of encoding circuits and storing said encoded selected portion of said data signal;

an encoding combining circuit receiving said data signal and said address signal from said computation section and providing respective selected portions of said data signal to each one of said plurality of encoding circuits.

3. The integrated storage medium recited in claim 2, wherein said plurality of encoding circuits, said plurality of data memories, and said encoding combination circuit are formed in a large scale integrated circuit.

* * * * *